United States Patent
Song et al.

(10) Patent No.: US 11,469,838 B2
(45) Date of Patent: Oct. 11, 2022

(54) METHOD AND DEVICE FOR IMPLEMENTING AN FPGA-BASED LARGE-SCALE RADIO FREQUENCY INTERFERENCE ARRAY CORRELATOR

(71) Applicants: INSTITUTE OF AUTOMATION, CHINESE ACADEMY OF SCIENCES, Beijing (CN); GUANGZHOU ARTIFICIAL INTELLIGENCE AND ADVANCED COMPUTING INSTITUTE OF CASIA, Guangzhou (CN)

(72) Inventors: Yafang Song, Beijing (CN); Jie Hao, Beijing (CN); Jun Liang, Beijing (CN); Lin Shu, Beijing (CN); Liangtian Zhao, Beijing (CN); Qiuxiang Fan, Beijing (CN); Hui Feng, Beijing (CN); Wenqing Hu, Beijing (CN)

(73) Assignees: INSTITUTE OF AUTOMATION, CHINESE ACADEMY OF SCIENCES, Beijing (CN); GUANGZHOU ARTIFICIAL INTELLIGENCE AND ADVANCED COMPUTING INSTITUTE OF CASIA, Guangzhou (CN)

( * ) Notice: Subject to any disclaimer, the term of this patent is extended or adjusted under 35 U.S.C. 154(b) by 129 days.

(21) Appl. No.: 17/270,871

(22) PCT Filed: May 25, 2020

(86) PCT No.: PCT/CN2020/092038
§ 371 (c)(1),
(2) Date: Feb. 24, 2021

(87) PCT Pub. No.: WO2021/164145
PCT Pub. Date: Aug. 26, 2021

(65) Prior Publication Data
US 2021/0384995 A1    Dec. 9, 2021

(30) Foreign Application Priority Data

Feb. 20, 2020  (CN) .......................... 202010105288.4

(51) Int. Cl.
H04B 17/345  (2015.01)
H04B 7/00    (2006.01)
G06F 17/15   (2006.01)

(52) U.S. Cl.
CPC ........... *H04B 17/345* (2015.01); *H04B 7/002* (2013.01); *G06F 17/153* (2013.01)

(58) Field of Classification Search
CPC ........ H04B 17/345; H04B 7/002; H04B 7/04; G06F 17/153; Y02D 30/70
See application file for complete search history.

(56) References Cited

U.S. PATENT DOCUMENTS

2006/0182193 A1    8/2006  Monsen
2018/0006690 A1*   1/2018  Shepard .............. H04B 7/0452
(Continued)

FOREIGN PATENT DOCUMENTS

CN          1749774 A    3/2006
CN         102540146 A   7/2012

*Primary Examiner* — Jae Y Lee
(74) *Attorney, Agent, or Firm* — Bayramoglu Law Offices LLC

(57) ABSTRACT

A method and device for implementing an FPGA-based large-scale radio frequency interference array correlator are provided. The method includes: obtaining the number of channels of data of a radio frequency interference array, and performing average division; calculating the total correlation of data group and the total correlation between the data group and other data groups respectively through corresponding correlation calculation modules, and performing an accumulation calculation in an integration period to complete the total correlation operation of the radio frequency interference array. By means of grouping division (Continued)

and time division multiplexing, the FPGA resource is effectively utilized, and the calculation process of FPGA is simplified. The new method is suitable for the operation process of the system with high parallelism and high real-time requirements, and provides a high-efficiency solution for the real-time calculation of massive data of the large-scale radio frequency interference array.

20 Claims, 4 Drawing Sheets

(56) References Cited

U.S. PATENT DOCUMENTS

2018/0123700 A1    5/2018  Li et al.
2021/0258029 A1*   8/2021  Cyzs .................... H04B 7/0854

* cited by examiner

METHOD AND DEVICE FOR IMPLEMENTING AN FPGA-BASED LARGE-SCALE RADIO FREQUENCY INTERFERENCE ARRAY CORRELATOR

CROSS REFERENCE TO THE RELATED APPLICATIONS

This application is the national phase entry of International Application No. PCT/CN2020/092038, filed on May 25, 2020, which is based upon and claims priority to Chinese Patent Application No. 202010105288.4, filed on Feb. 20, 2020, the entire contents of which are incorporated herein by reference.

TECHNICAL FIELD

The present invention belongs to the technical field of signal processing, and more particularly, to a method and device for implementing a field-programmable gate array (FPGA)-based large-scale radio frequency interference array correlator.

BACKGROUND

In the radio frequency interference telescope array, the correlator is used as the core digital device to calculate the interference display degree. The research work of observing the brightness distribution, structure, precision positioning and celestial imaging of the cosmic radio frequency source can be achieved by the calculation and analysis of the interference display degree.

In order to realize the observation with a wider field of view and higher precision, researchers are building or going to build a large-scale antenna array, and thus the correlator is required to perform the total correlation processing on the signals of massive antennas. The total correlation processing includes auto-correlation calculation and pairwise cross-correlation calculation of multi-channel data of all the same frequency points at the same time. The amount of calculation is proportional to $N^2$, where N is the number of antennas. However, the amount of calculation increases sharply with the increase of N, for example, the Low-Frequency Array (LOFAR) in Europe is composed of 20000 antennas, and thus has an extraordinarily large amount of calculation. The traditional correlator is generally implemented by central processing units (CPU) or graphics processing units (GPU), but because of its low performance-power ratio and high delay, CPU or GPU is difficult to be used to realize the total correlation real-time calculation of large-scale antenna arrays. Compared with CPU and GPU, FPGA has better energy efficiency, low delay, high parallelism, easy expansion, a large number of multiplier resources and low power consumption. Thus, FPGA is competent to implement the algorithms that have high parallelism and require high real-time performance.

Generally, the prior CPU/GPU-based correlators have low efficiency and high energy consumption when computing the total correlation of large-scale antenna arrays in real time. Therefore, it is highly desired to develop an FPGA-based digital correlator to realize the total correlation real-time computation of large-scale antenna arrays.

SUMMARY

In order to solve the problems of the low efficiency and high energy consumption of prior CPU/GPU-based correlator for total correlation real-time calculation of large-scale antenna arrays, the present invention provides a method for implementing an FPGA-based large-scale radio frequency interference array correlator, including:

step S10: according to the number $M_a$ of antennas of a radio frequency interference array and the polarization number $M_P$ of each antenna, obtaining the number M of channels of data of the antennas of the radio frequency interference array;

step S20: averagely dividing the M channels of obtained data of the radio frequency interference array into N groups of data according to preset conditions, wherein each group of data includes K channels of data, and K=M/N; and step S30: rearranging the N groups of data by a method of time division multiplexing, and successively performing an auto-correlation calculation of each group of data in the N groups of data and a cross-correlation calculation between each group of data and other groups of data in the N groups of data respectively through corresponding correlation calculation modules to complete the total correlation operation of the radio frequency interference array.

In some preferred embodiments, the preset conditions are as follows:

$$Z1 \times \frac{1}{T1} < Z2 \times \frac{1}{T2};$$

$$Z2 < Z;$$

wherein, $$Z1 = \frac{1}{2} \times M \times (M+1) \times 4 \times \frac{P1}{P},$$

$$Z2 = \left[\frac{1}{2} \times K \times (K+1) \times B1 + K \times K \times B2\right] \times 4,$$

P is the number of fast Fourier transform (FFT) points, P1 is the number of selected frequency points, T1 is a sampling clock, T2 is a processing clock of the correlator, B1 is the number of auto-correlation calculation modules, B2 is the number of cross-correlation calculation modules, and Z is the total number of multipliers in an FPGA chip.

In some preferred embodiments, the auto-correlation calculation of a group of data includes an auto-correlation calculation and an accumulation calculation in an integration period of each channel of data in a data group, and a cross-correlation calculation and an accumulation calculation in the integration period between the each channel of data and other channels of data in the data group.

In some preferred embodiments, the cross-correlation calculation between a group of data and another group of data includes a cross-correlation calculation and an accumulation calculation in an integration period between each channel of data in the group and each channel of data in another group.

In some preferred embodiments, the method of time division multiplexing for rearranging the N groups of data in step S30 includes:

step S31: classifying the N groups of data into a first data sequence for the auto-correlation calculation, and a second data sequence for the cross-correlation calculation; and step S32: averagely dividing the first data sequence and the second data sequence into segments according to the number of auto-correlation calculation modules and the number of cross-correlation calculation modules, respectively, performing time division multiplexing on the corresponding correlation calculation modules in each segment, and rearranging the N groups of data according to the operation of each segment.

According to the second aspect of the present invention, an FPGA-based large-scale radio frequency interference array correlator device includes a data receiving module, a writing control module, a cache module, a reading control module, a data rearrangement module, a correlation calculation module, and a packaging output module.

The data receiving module is configured to obtain a data packet containing antenna frequency domain data and parse packet header information of the data packet. The packet header information includes channel information and frequency point information.

The writing control module is configured to write the antenna frequency domain data to a corresponding cache position of the cache module based on the packet header information.

The cache module is configured to cache the antenna frequency domain data.

The reading control module is configured to determine whether frequency domain data of different channels in the cache module are aligned, and synchronously read out data of each channel at the same time and the same frequency point if the frequency domain data of the different channels in the cache module are aligned.

The data rearrangement module is configured to perform data grouping and rearrangement by methods corresponding to steps S20 to S30 of the method for implementing the FPGA-based large-scale radio frequency interference array correlator, and send rearranged data to the corresponding correlation calculation module.

The correlation calculation module is configured to first perform a total correlation calculation on received data and then perform an accumulation calculation in an integration period.

The packaging output module is configured to package data calculated by the correlation calculation module into a data packet according to a set sequence, and output the data packet.

In some preferred embodiments, the cache module is implemented by a block random access memory (BRAM).

In some preferred embodiments, the correlation calculation module includes an auto-correlation calculation module and a cross-correlation calculation module.

The auto-correlation calculation module is configured to perform an auto-correlation calculation of a data group.

The cross-correlation calculation module is configured to perform a cross-correlation calculation between the data group and other data groups.

According to the third aspect of the present invention, a storage device is provided, wherein a plurality of programs are stored in the storage device, and the programs are configured to be loaded and executed by a processor to implement the method for implementing an FPGA-based large-scale radio frequency interference array correlator described above.

According to the fourth aspect of the present invention, a processing device includes a processor and a storage device. The processor is configured to execute a plurality of programs. The storage device is configured to store the plurality of programs. The programs are configured to be loaded and executed by the processor to implement the method for implementing an FPGA-based large-scale radio frequency interference array correlator described above.

The present invention has the following advantages.

In the method for implementing an FPGA-based large-scale radio frequency interference array correlator of the present invention, the data are grouped and rearranged by the method of time division multiplexing to effectively utilize the FPGA resource, thereby simplifying the calculation process of FPGA. The method of the present invention has low power consumption, high efficiency and easy expansion, is suitable for the operation process of the system with high parallelism and high real-time requirements, and provides an efficient method for the real-time calculation of massive data of the large-scale radio frequency interference array.

BRIEF DESCRIPTION OF THE DRAWINGS

By reading the detailed description of the non-restrictive embodiments with reference to the following drawings, other features, objectives and advantages of the present invention will become more obvious.

FIG. 2 is a schematic diagram of a calculation structure for grouping division of multi-channel data and time division multiplexing according to an embodiment of the method for implementing the FPGA-based large-scale radio frequency interference array correlator of the present invention;

FIG. 3 is a schematic diagram of a calculation structure of an auto-correlation calculation module according to an embodiment of the method for implementing the FPGA-based large-scale radio frequency interference array correlator of the present invention;

FIG. 4 is a schematic diagram of a calculation structure of a cross-correlation calculation module according to an embodiment of the method for implementing the FPGA-based large-scale radio frequency interference array correlator of the present invention;

DETAILED DESCRIPTION OF THE EMBODIMENTS

Figure 1:
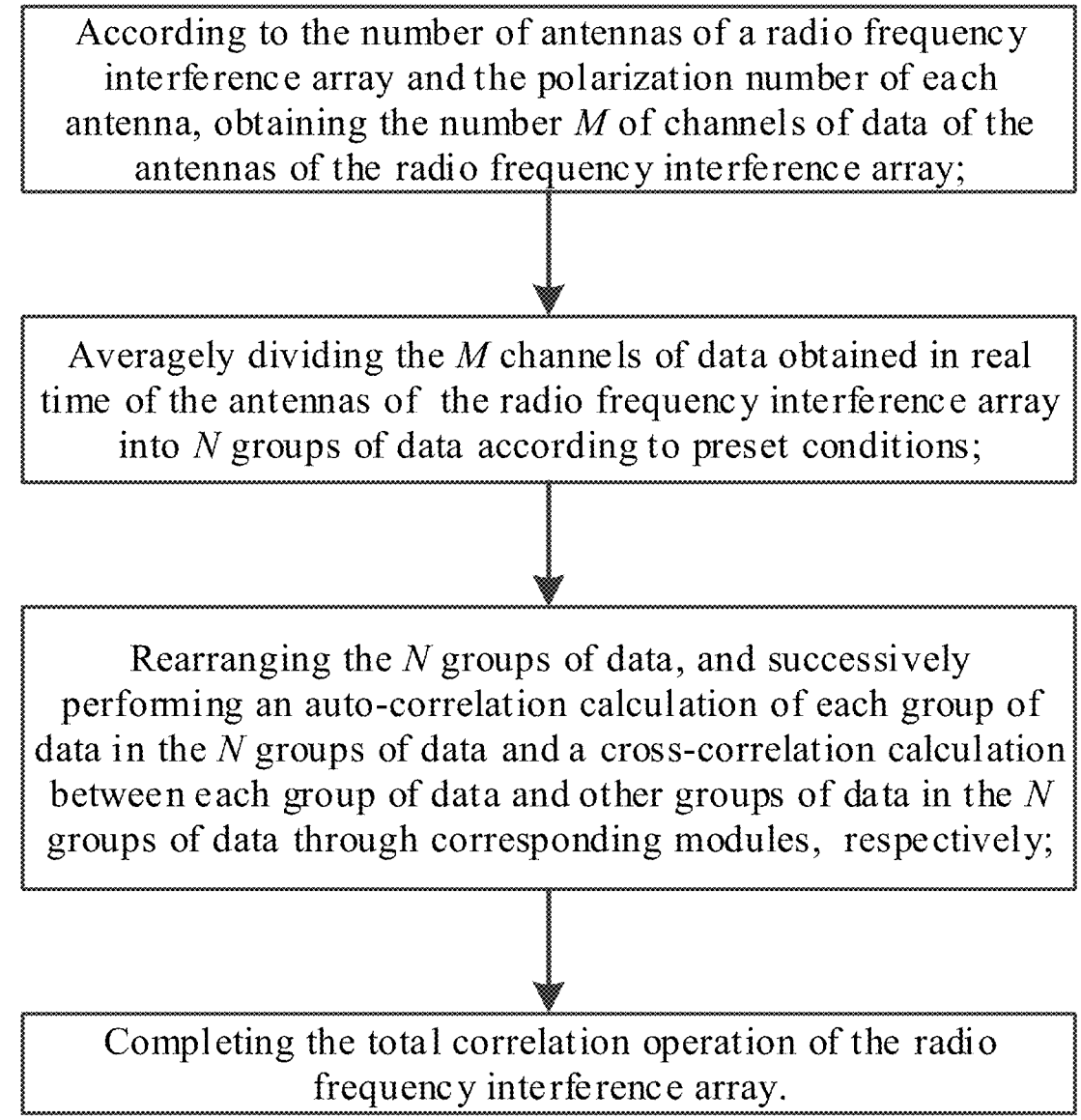
FIG. 1 is a flow chart of a method for implementing an FPGA-based large-scale radio frequency interference array correlator according to the present invention.

The present invention is further described in detail hereinafter with reference to the drawings and embodiments. Understandably, the specific embodiments described herein are only used to explain the present invention rather than to limit the present invention. In addition, it should be noted that for the convenience of description, only the parts related to the present invention are shown in the drawings.

It should be noted that without conflict, the embodiments in the present invention and the features in the embodiments may be combined with each other. The present invention will be explained in detail with reference to the drawings and embodiments below.

A method for implementing an FPGA-based large-scale radio frequency interference array correlator according to the present invention includes the following steps.

Step S10: according to the number $M_a$ of antennas of the radio frequency interference array and the polarization number $M_P$ of each antenna, the number M of channels of data of the antennas of the radio frequency interference array is obtained.

Step S20: the M channels of obtained data of the radio frequency interference array are averagely divided into N groups of data according to preset conditions, and each group of data includes K channels of data, where K=M/N.

Step S30: the N groups of data are rearranged by a method of time division multiplexing, and the auto-correlation calculation of each group of data in the N groups of data and the cross-correlation calculation between each group of data and other groups of data in the N groups of data are successively performed through the corresponding correlation calculation modules, respectively, to complete the total correlation operation of the radio frequency interference array.

In order to more clearly explain the method for implementing an FPGA-based large-scale radio frequency interference array correlator of the present invention, the steps in the embodiment of the method of the present invention are described in detail below with reference to FIG. 1.

According to an embodiment of the present invention, a method for implementing an FPGA-based large-scale radio frequency interference array correlator includes steps S10-S30, and each step is described in detail as follows.

Step S10: according to the number $M_a$ of antennas of the radio frequency interference array and the polarization number $M_P$ of each antenna, the number M of channels of data of the antennas of the radio frequency interference array is obtained.

Assuming that the number of antennas of the radio frequency interference array is $M_a$ and the polarization number of each antenna is $M_P$, then there are M channels of data, where $M=M_a \times M_P$.

Step S20: the M channels of obtained data of the radio frequency interference array are averagely divided into N groups of data according to preset conditions, and each group of data includes K channels of data, where K=M/N.

The preset conditions are as shown in Formula (1) and Formula (2):

$$Z1 \times \frac{1}{T1} < Z2 \times \frac{1}{T2}; \quad (1)$$

$$Z2 < Z. \quad (2)$$

The Z1 and Z2 are calculated respectively through Formula (3) and Formula (4):

$$Z1 = \frac{1}{2} \times M \times (M+1) \times 4 \times \frac{P1}{P}; \quad (3)$$

$$Z2 = \left[\frac{1}{2} \times K \times (K+1) \times B1 + K \times K \times B2\right] \times 4; \quad (4)$$

where, P is the number of fast Fourier transform (FFT) points, P1 is the number of selected frequency points, T1 is a sampling clock, T2 is a processing clock of the correlator, B1 is the number of the auto-correlation calculation modules, B2 is the number of the cross-correlation calculation modules, and Z is the total number of multipliers in the FPGA chip.

The method of the present invention averagely divides the M channels of data into N groups of data. The $1^{st}$ channel of data to the $K^{th}$ channel of data are classified into the $1^{st}$ group of data, the $(K+1)^{th}$ channel of data to the $(2K)^{th}$ channel of data are classified into the $2^{nd}$ group of data, and so on, similarly, the $((N-1)K+1)^{th}$ channel of data to the $M^{th}$ channel of data are classified into the $N^{th}$ group of data, where K=M/N. In this way, the total correlation calculation of M channels of data can be converted into the total correlation calculation of N groups of data.

Step S30: the N groups of data are rearranged by a method of time division multiplexing, and the auto-correlation calculation of each group of data in the N groups of data and the cross-correlation calculation between each group of data and other groups of data in the N groups of data are successively performed through the corresponding correlation calculation modules, respectively, to complete the total correlation operation of the radio frequency interference array.

The method of time division multiplexing for rearranging the N groups of data includes the following steps.

Step S31: in the N groups of data, the data that the auto-correlation calculation is performed on are classified into a first data sequence, and the data that the cross-correlation calculation is performed on are classified into a second data sequence.

Step S32: the first data sequence and the second data sequence are averagely divided into segments according to the number of the auto-correlation calculation modules and the number of the cross-correlation calculation modules, respectively. The time division multiplexing is performed on the corresponding correlation calculation modules in each segment, and the N groups of data are rearranged according to the operation of each segment.

In this method, the correlation calculations with the same calculation rule can be performed by the same correlation calculation module in FPGA by time-division multiplexing, thus reducing the use of multiplier resources in FPGA, which is beneficial to overall layout and wire arrangement.

Figure 2:
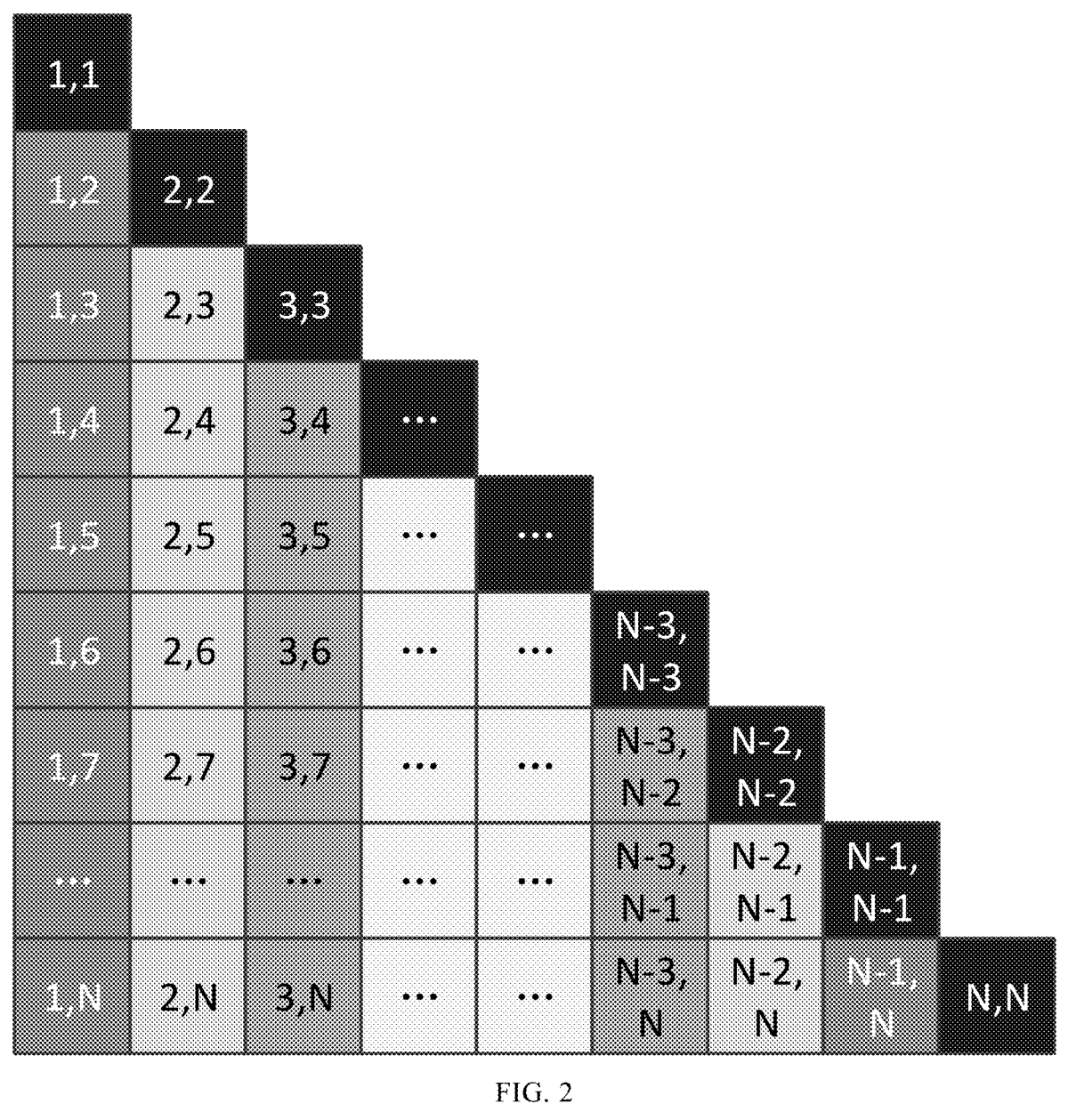

FIG. 2 is a schematic diagram of a calculation structure for grouping division of multi-channel data and time division multiplexing according to an embodiment of the method for implementing the FPGA-based large-scale radio frequency interference array correlator of the present invention. The reference number in FIG. 2 represents the group number, for example, the module [k, n] represents the total correlation calculation between the $k^{th}$ group of data and the $n^{th}$ group of data. When k=n, the correlation calculation includes auto-correlation calculation, has symmetry, and can be realized by the auto-correlation calculation module. When k≠n, the correlation calculation is all cross-correlation calculation, and has no symmetry, and can be realized by the cross-correlation calculation module. The computing resource of the module [k, n] (k=n) is about half less than the computing resource of the module [k, n] (k≠n), so the number of auto-correlation computing modules in the system is about half of the number of the cross-correlation computing modules.

The modules with the same gray scale in FIG. 2 can multiplex the same correlation calculation module to achieve the time division multiplexing, that is, the module [k, k] can multiplex the same auto-correlation calculation module 16A, and the module [$k_1$, $n_1$] and the module [$k_2$, $n_2$] can multiplex the same cross-correlation calculation module 16B, where $k_1+k_2=N$ (N is the number of groups), and $n_1>k_1$, $n_2>k_2$. In this way, the computational load of each correlation calculation module in a correlator device can be balanced. The above only represents one multiplexing mode. The number of data of the correlator 16A and the number of the correlator 16B are determined according to the data acquisition frequency, the data processing frequency and the number of antennas in each group after grouping, and then the N groups of data are rearranged according to the method of time division multiplexing.

The auto-correlation calculation module includes the auto-correlation calculation and the accumulation calculation in an integration period of each channel of data in a data group, and the cross-correlation calculation and the accumulation calculation in the integration period between the each channel of data and other channels of data in the in data group.

Figures 3, 4:
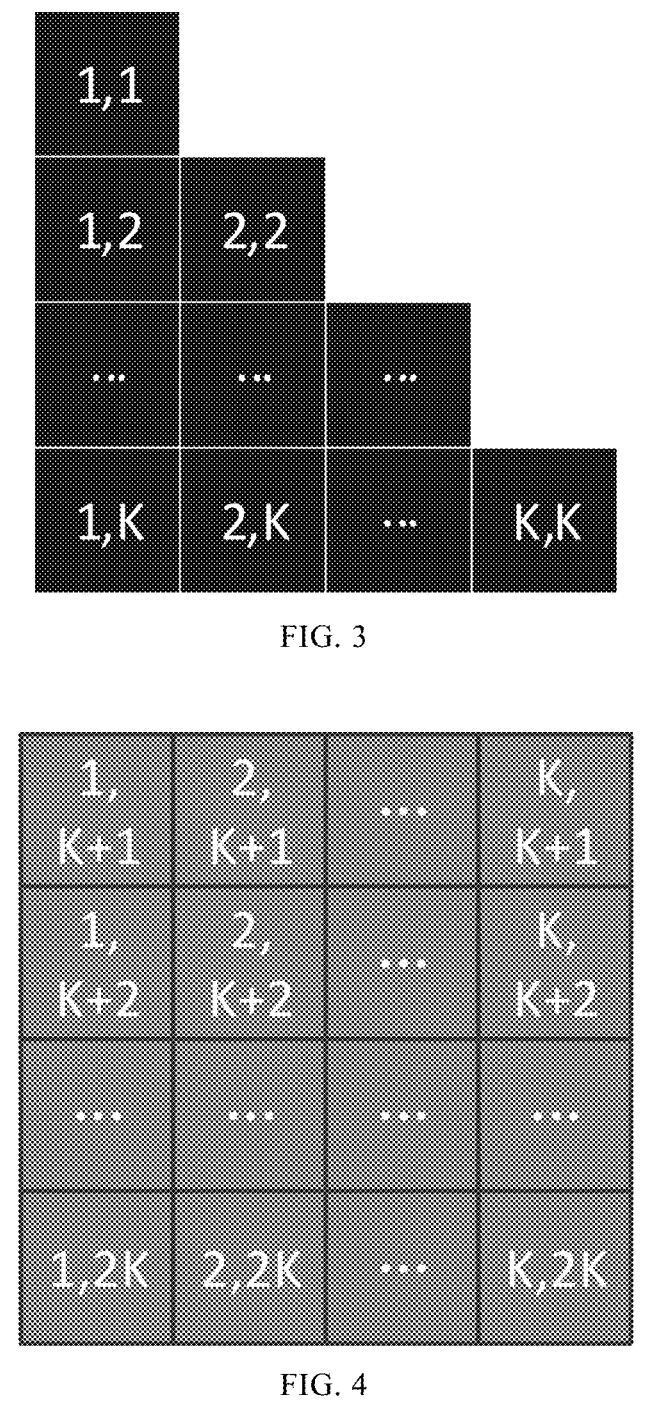

FIG. 3 is a schematic diagram of a calculation structure of an auto-correlation calculation module according to an embodiment of the method for implementing the FPGA-based large-scale radio frequency interference array correlator of the present invention. The reference number in FIG. 3 represents the channel number, for example, the module [l, p] represents the correlation calculation between the $l^{th}$ channel of data and the $p^{th}$ channel of data.

The cross-correlation calculation module includes the cross-correlation calculation and the accumulation calculation in an integration period between each channel of data in a group and each channel of data in another group.

FIG. 4 is a schematic diagram of a calculation structure of a cross-correlation calculation module according to an embodiment of the method for implementing the FPGA-based large-scale radio frequency interference array correlator of the present invention. The reference number in FIG. 4 similarly represents the channel number, for example, the module [l, p] represents the correlation calculation between the $l^{th}$ channel of data and the $p^{th}$ channel of data.

Figure 5:
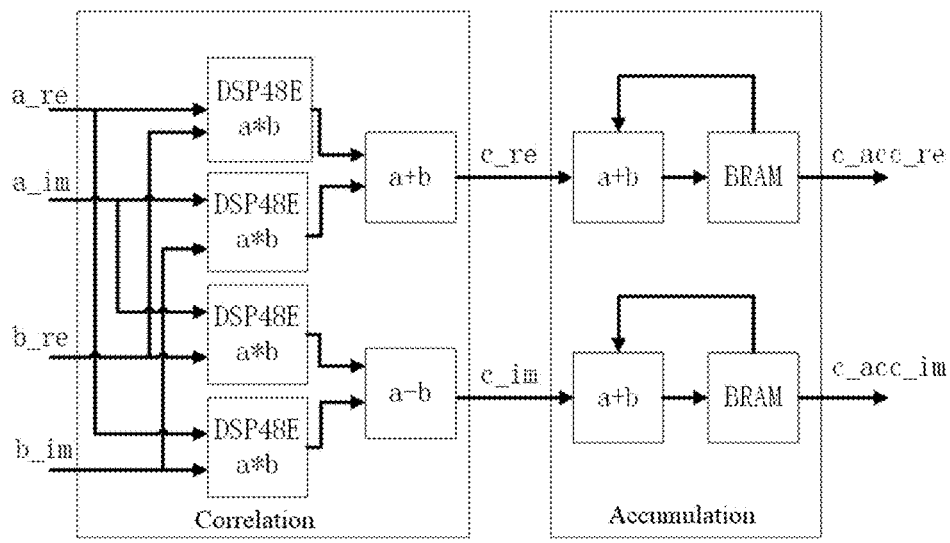
FIG. 5 is a schematic diagram of the structure of an FPGA-based correlation calculation module according to an embodiment of the method for implementing the FPGA-based large-scale radio frequency interference array correlator of the present invention.

Each module in FIG. 3 and FIG. 4 performs the same calculation, that is, perform the total correlation calculation and the accumulation calculation in the integration period of the two channels of data at the same time and the same frequency point. FIG. 5 is a schematic diagram of the structure of an FPGA-based correlation calculation module according to an embodiment of the method for implementing the FPGA-based large-scale radio frequency interference array correlator of the present invention. Assuming that the data of k (k is a power of 2) different frequency points at $t_n$ moment (n=0, 1, 2, ..., N) in one integration period in the $(R_i)^{th}$ channel of data is $\{R_{in0}, R_{in1}, ..., R_{ink}\}$, and the data of the corresponding same frequency points at the same moment in the $(R_j)^{th}$ channel of data is $\{R_{jn0}, R_{jn1}, R_{jnk}\}$, then the correlation calculation module uses the DSP48E slice and adder computing resources in FPGA to realize the complex conjugate multiplication of the same frequency points, that is, to realize $\{R_{in0} \times R^*_{jn0}, R_{in1} \times R^*_{jn1}, ..., R_{ink} \times R^*_{jnk}\}$. The data of k frequency points successively enter into the correlation calculation module to complete the correlation calculation. The accumulation calculation uses the adder and the BRAM to realize the accumulation in an integration period, that is, to realize $\{\Sigma_{n=0}^{N} R_{in0} \times R^*_{jn0}, \Sigma_{n=0}^{N} R_{in1} \times R^*_{jn1}, ..., \Sigma_{n=0}^{N} R_{ink} \times R^*_{jnk}\}$. The BRAM has a depth of k, and the result of each accumulation of k frequency points is temporarily stored in the BRAM. The adder realizes the accumulation of the temporary data read out by BRAM in real time and the relevant data calculated by the relevant module at the latest time. The latest result again is temporarily stored in the BRAM until the end of the integration period, and the BRAM outputs the final result of relevant accumulations.

Figure 6:
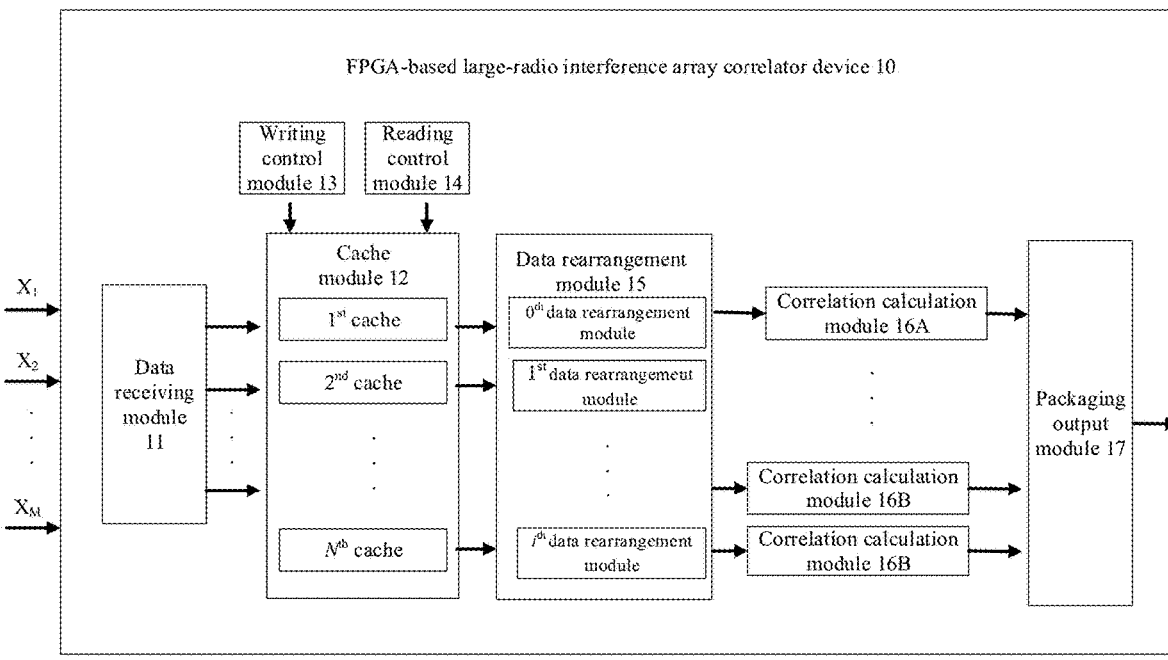
FIG. 6 is a block diagram of an FPGA-based large-scale radio frequency interference array correlator device according to an embodiment of the method for implementing the FPGA-based large-scale radio frequency interference array correlator of the present invention.

According to a second embodiment of the present invention, as shown in FIG. 6, the FPGA-based large-scale radio frequency interference array correlator device 10 includes the data receiving module 11, the writing control module 13, the cache module 12, the reading control module 14, the data rearrangement module 15, the correlation calculation module 16, and the packaging output module 17.

The data receiving module 11 is configured to obtain a data packet containing antenna frequency domain data and to parse packet header information of the data packet. The packet header information includes channel information and frequency point information.

The writing control module 13 is configured to write the antenna frequency domain data to the corresponding cache position of the cache module 12 based on the packet header information.

The cache module 12 is configured to cache the antenna frequency domain data, and the cache module is implemented by the BRAM.

The reading control module 14 is configured to determine whether frequency domain data of different channels in the cache module 12 are aligned, and synchronously read out data of each channel at the same time and the same frequency point if the frequency domain data of different channels in the cache module 12 are aligned. If the bit width of data of each antenna is B, then the bit width of data output by the cache module 12 may be K*B, which is beneficial to the subsequent data rearrangement.

The data rearrangement module 15 is configured to perform data grouping and rearrangement by methods corresponding to steps S20 to S30 of the method for implementing the FPGA-based large-scale radio frequency interference array correlator, and send the rearranged data to the corresponding correlation calculation module.

The correlation calculation module 16 is configured to first perform the total correlation calculation on the received data and then perform the accumulation calculation in an integration period.

The correlation calculation module includes the auto-correlation calculation module 16A and the cross-correlation calculation module 16B.

The auto-correlation calculation module 16A is configured to perform the auto-correlation calculation of a data group.

The cross-correlation calculation module 16B is configured to perform the cross-correlation calculation between the data group and other data groups.

For example, in the implementation method as shown in FIG. 2, the $0^{th}$ data rearrangement module outputs two channels of data, i.e. [1, 2, 3, ..., N] and [1, 2, 3, ..., N] (N represents the group data), to the auto-correlation calculation module 16A for the correlation calculation, and the $i^{th}$ data rearrangement module outputs two channels of data, i.e. [i, i, ..., i, N-i, ..., N-i] and [i+1, i+2, ..., N, N-i+1, ..., N] (N represents the group data), to the cross-correlation calculation module 16B for calculation. Specifically, $[k_1, k_2, k_3, ..., k_n]$ output by the rearrangement module represents the way of data rearrangement, wherein the rearrangement module at the $t_0$ moment outputs $k_1$ groups of data, the rearrangement module at the $t_1$ moment outputs $k_2$ groups of data, and so on, similarly, the rearrangement module at the $t_n$ moment outputs $k_n$ groups of data.

The packaging output module 17 is configured to package the data calculated by the correlation calculation module 16 into a data packet according to a set sequence, and output the data packet.

The data that the total correlation calculation is performed on are packaged into the data packet. The data packet can be sent to an upper computer and/or a storage server for further scientific research using Gigabit Ethernet or 10-Gigabit Ethernet.

It can be clearly understood by those skilled in the art that for the convenience and brevity of the description, the specific working process and related description of the system described above can refer to the corresponding processes in the foregoing embodiments of the method of the present invention, which will not be repeatedly described here.

It should be noted that the method and device for implementing the FPGA-based large-scale radio frequency interference array correlator provided in the above embodiment are only exemplified by the division of the above functional modules. In practical applications, the above functions may be allocated to be completed by different functional modules as needed, that is, the modules or steps in the embodiments of the present invention are further decomposed or combined. For example, the modules in the above embodiments can be combined into one module, or can be further split into a plurality of sub-modules to complete all or a part of the functions of the above description. The designations of the modules and steps involved in the embodiments of the present invention are only intended to distinguish these modules or steps, and should not be construed as an improper limitation of the present invention.

The third embodiment of the present invention provides a storage device, wherein a plurality of programs are stored in the storage device. The programs are configured to be loaded and executed by a processor to implement the method for implementing the FPGA-based large-scale radio frequency interference array correlator described above.

A processing device according to the fourth embodiment of the present invention includes a processor and a storage device. The processor is configured to execute a plurality of programs, and the storage device is configured to store the plurality of programs. The programs are configured to be loaded and executed by the processor to implement the method for implementing the FPGA-based large-scale radio frequency interference array correlator described above.

It can be clearly understood by those skilled in the art that for the convenience and brevity of the description, the specific working process and related description of the storage device and the processing device described above can refer to the corresponding processes in the foregoing embodiments of the method of the present invention, which will not be repeatedly described here.

Those skilled in the art can realize that the exemplary modules and steps of methods described with reference to the embodiments disclosed herein can be implemented by electronic hardware, computer software or a combination of the electronic hardware and the computer software. The programs corresponding to modules of software and/or steps of methods can be stored in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage mediums well-known in the technical field. In order to clearly illustrate the interchangeability of electronic hardware and software, in the above description, the compositions and steps of each embodiment have been generally described functionally. Whether these functions are performed by electronic hardware or software depends on specific applications and design constraints of the technical solution. Those skilled in the art may use different methods to implement the described functions for each specific application, but such implementation should not be considered beyond the scope of the present invention.

The terms "first", "second" and the like are used to distinguish similar objects, but not to describe or indicate a specific order or sequence.

The terminology "comprise/include" or any other similar terminologies are intended to cover non-exclusive inclusions, so that a process, method, article or apparatus/device including a series of elements not only includes those elements but also includes other elements that are not explicitly listed, or further includes elements inherent in the process, method, article or apparatus/device.

Hereto, the technical solutions of the present invention have been described in combination with the preferred implementations with reference to the drawings. However, it is easily understood by those skilled in the art that the scope of protection of the present invention is obviously not limited to these specific embodiments. Without departing from the principle of the present invention, those skilled in the art can make equivalent modifications or replacements to related technical features, and the technical solutions obtained through these modifications or replacements shall fall in the scope of protection of the present invention.

What is claimed is:

1. A method for implementing an FPGA-based large-scale radio frequency interference array correlator, comprising:

step S10: according to a number $M_a$ of antennas of a radio frequency interference array and a polarization number $M_P$ of each antenna of the antennas, obtaining a number M of channels of data of the antennas of the radio frequency interference array;

step S20: averagely dividing M channels of data of the radio frequency interference array into N groups of data according to preset conditions, wherein each group of data of the N groups of data comprises K channels of data, and K=M/N; and step S30: rearranging the N groups of data by a method of time division multiplexing, successively performing an auto-correlation calculation of the each group of data in the N groups of data through auto-correlation calculation modules and performing a cross-correlation calculation between the each group of data and other groups of data in the N groups of data through cross-correlation calculation modules, and completing a total correlation operation of the radio frequency interference array.

2. The method according to claim 1, wherein the preset conditions are as follows:

$$Z1 \times \frac{1}{T1} < Z2 \times \frac{1}{T2};$$

$$Z2 < Z;$$

wherein, $$Z1 = \frac{1}{2} \times M \times (M+1) \times 4 \times \frac{P1}{P},$$

$$Z2 = \left[\frac{1}{2} \times K \times (K+1) \times B1 + K \times K \times B2\right] \times 4,$$

P is a number of fast Fourier transform (FFT) points, P1 is a number of selected frequency points, T1 is a sampling clock, T2 is a processing clock of the FPGA-based large-scale radio frequency interference array correlator, B1 is a number of the auto-correlation calculation modules, B2 is a number of the cross-correlation calculation modules, and Z is a total number of multipliers in an FPGA chip.

3. The method according to claim 1, wherein the auto-correlation calculation of a group of data in the N groups of data comprises an auto-correlation calculation and an accumulation calculation in an integration period of each channel of data in a data group, and a cross-correlation calculation and an accumulation calculation in the integration period between the each channel of data and other channels of data in the data group.

4. The method according to claim 1, wherein the cross-correlation calculation between a group of data and another group of data in the N groups of data comprises a cross-correlation calculation and an accumulation calculation in an integration period between each channel of data in the group and each channel of data in another group.

5. The method according to claim 1, wherein the method of time division multiplexing for rearranging the N groups of data in step S30 comprises:
  step S31: classifying the N groups of data into a first data sequence for the auto-correlation calculation, and a second data sequence for the cross-correlation calculation; and
  step S32: averagely dividing the first data sequence and the second data sequence into segments according to a number of the auto-correlation calculation modules and a number of the cross-correlation calculation modules, respectively, performing the time division multiplexing on the auto-correlation correlation calculation modules and the cross-correlation calculation modules in each segment of the segments, and rearranging the N groups of data according to an operation of the each segment.

6. An FPGA-based large-scale radio frequency interference array correlator device, comprising a data receiving module, a writing control module, a cache module, a reading control module, a data rearrangement module, a correlation calculation module, and a packaging output module; wherein
  the data receiving module is configured to obtain a first data packet and parse packet header information of the first data packet; wherein the first data packet contains antenna frequency domain data, and the packet header information comprises channel information and frequency point information;
  the writing control module is configured to write the antenna frequency domain data to a cache position of the cache module, wherein the cache position corresponds to the packet header information;
  the cache module is configured to cache the antenna frequency domain data;
  the reading control module is configured to determine whether frequency domain data of different channels in the cache module are aligned, and synchronously read out data of each channel at a same time and a same frequency pointer when the frequency domain data of the different channels in the cache module are aligned;
  the data rearrangement module is configured to perform data grouping and rearrangement by steps S20 to S30 of the method for implementing the FPGA-based large-scale radio frequency interference array correlator according to claim 1, and send rearranged data to the correlation calculation module;
  the correlation calculation module is configured to first perform a total correlation calculation on received data and then perform an accumulation calculation in an integration period; and
  the packaging output module is configured to package data calculated by the correlation calculation module into a second data packet according to a set sequence, and output the second data packet.

7. The FPGA-based large-scale radio frequency interference array correlator device according to claim 6, wherein the cache module is implemented by a block random access memory (BRAM).

8. The FPGA-based large-scale radio frequency interference array correlator device according to claim 6, wherein the correlation calculation module comprises an auto-correlation calculation module and a cross-correlation calculation module;
  the auto-correlation calculation module is configured to perform an auto-correlation calculation of a data group; and
  the cross-correlation calculation module is configured to perform a cross-correlation calculation between the data group and other data groups.

9. A storage device, wherein a plurality of programs are stored in the storage device, and the plurality of programs are configured to be loaded and executed by a processor to implement the method for implementing the FPGA-based large-scale radio frequency interference array correlator according to claim 1.

10. A processing device, comprising:
  a processor, and
  a storage device, wherein
  the processor is configured to execute a plurality of programs, and the storage device is configured to store the plurality of programs;
  the plurality of programs are configured to be loaded and executed by the processor to implement the method for implementing the FPGA-based large-scale radio frequency interference array correlator according to claim 1.

11. The FPGA-based large-scale radio frequency interference array correlator device according to claim 6, wherein the preset conditions are as follows:

$$Z1 \times \frac{1}{T1} < Z2 \times \frac{1}{T2};$$

$$Z2 < Z;$$

wherein, $$Z1 = \frac{1}{2} \times M \times (M+1) \times 4 \times \frac{P1}{P},$$

$$Z2 = \left[\frac{1}{2} \times K \times (K+1) \times B1 + K \times K \times B2\right] \times 4,$$

P is a number of fast Fourier transform (FFT) points, P1 is a number of selected frequency points, T1 is a sampling clock, T2 is a processing clock of the FPGA-based large-scale radio frequency interference array correlator, B1 is a number of the auto-correlation calculation modules, B2 is a number of the cross-correlation calculation modules, and Z is a total number of multipliers in an FPGA chip.

12. The FPGA-based large-scale radio frequency interference array correlator device according to claim 6, wherein the auto-correlation calculation of a group of data in the N groups of data comprises an auto-correlation calculation and an accumulation calculation in an integration period of each channel of data in a data group, and a cross-correlation calculation and an accumulation calculation in the integration period between the each channel of data and other channels of data in the data group.

13. The FPGA-based large-scale radio frequency interference array correlator device according to claim 6, wherein the cross-correlation calculation between a group of data and another group of data in the N groups of data comprises a cross-correlation calculation and an accumulation calculation in an integration period between each channel of data in the group and each channel of data in another group.

14. The FPGA-based large-scale radio frequency interference array correlator device according to claim 6, wherein the method of time division multiplexing for rearranging the N groups of data in step S30 comprises:
   step S31: classifying the N groups of data into a first data sequence for the auto-correlation calculation, and a second data sequence for the cross-correlation calculation; and
   step S32: averagely dividing the first data sequence and the second data sequence into segments according to a number of the auto-correlation calculation modules and a number of the cross-correlation calculation modules, respectively, performing the time division multiplexing on the auto-correlation correlation calculation modules and the cross-correlation calculation modules in each segment of the segments, and rearranging the N groups of data according to an operation of the each segment.

15. The storage device according to claim 9, wherein the preset conditions are as follows:

$$Z1 \times \frac{1}{T1} < Z2 \times \frac{1}{T2};$$
$$Z2 < Z;$$

wherein, $$Z1 = \frac{1}{2} \times M \times (M+1) \times 4 \times \frac{P1}{P},$$
$$Z2 = \left[\frac{1}{2} \times K \times (K+1) \times B1 + K \times K \times B2\right] \times 4,$$

P is a number of fast Fourier transform (FFT) points, P1 is a number of selected frequency points, T1 is a sampling clock, T2 is a processing clock of the FPGA-based large-scale radio frequency interference array correlator, B1 is a number of the auto-correlation calculation modules, B2 is a number of the cross-correlation calculation modules, and Z is a total number of multipliers in an FPGA chip.

16. The storage device according to claim 9, wherein the auto-correlation calculation of a group of data in the N groups of data comprises an auto-correlation calculation and an accumulation calculation in an integration period of each channel of data in a data group, and a cross-correlation calculation and an accumulation calculation in the integration period between the each channel of data and other channels of data in the data group.

17. The storage device according to claim 9, wherein the cross-correlation calculation between a group of data and another group of data in the N groups of data comprises a cross-correlation calculation and an accumulation calculation in an integration period between each channel of data in the group and each channel of data in another group.

18. The storage device according to claim 9, wherein the method of time division multiplexing for rearranging the N groups of data in step S30 comprises:
   step S31: classifying the N groups of data into a first data sequence for the auto-correlation calculation, and a second data sequence for the cross-correlation calculation; and
   step S32: averagely dividing the first data sequence and the second data sequence into segments according to a number of the auto-correlation calculation modules and a number of the cross-correlation calculation modules, respectively, performing the time division multiplexing on the auto-correlation correlation calculation modules and the cross-correlation calculation modules in each segment of the segments, and rearranging the N groups of data according to an operation of the each segment.

19. The processing device according to claim 10, wherein the preset conditions are as follows:

$$Z1 \times \frac{1}{T1} < Z2 \times \frac{1}{T2};$$
$$Z2 < Z;$$

wherein, $$Z1 = \frac{1}{2} \times M \times (M+1) \times 4 \times \frac{P1}{P},$$
$$Z2 = \left[\frac{1}{2} \times K \times (K+1) \times B1 + K \times K \times B2\right] \times 4,$$

P is a number of fast Fourier transform (FFT) points, P1 is a number of selected frequency points, T1 is a sampling clock, T2 is a processing clock of the FPGA-based large-scale radio frequency interference array correlator, B1 is a number of the auto-correlation calculation modules, B2 is a number of the cross-correlation calculation modules, and Z is a total number of multipliers in an FPGA chip.

20. The processing device according to claim 10, wherein the auto-correlation calculation of a group of data in the N groups of data comprises an auto-correlation calculation and an accumulation calculation in an integration period of each channel of data in a data group, and a cross-correlation calculation and an accumulation calculation in the integration period between the each channel of data and other channels of data in the data group.

\* \* \* \* \*